United States Patent
Faw et al.

(10) Patent No.: US 9,880,367 B2
(45) Date of Patent: Jan. 30, 2018

(54) HYBRID ELECTRICAL/OPTICAL CONNECTOR

(71) Applicant: Intel Corporation, Santa Clara, CA (US)

(72) Inventors: Donald Faw, Banks, OR (US); Zining Huang, Fremont, CA (US); Ansheng Liu, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/024,920

(22) PCT Filed: Dec. 19, 2013

(86) PCT No.: PCT/US2013/076553
§ 371 (c)(1),
(2) Date: Mar. 25, 2016

(87) PCT Pub. No.: WO2015/094283
PCT Pub. Date: Jun. 25, 2015

(65) Prior Publication Data
US 2016/0238808 A1 Aug. 18, 2016

(51) Int. Cl.
*G02B 6/36* (2006.01)
*G02B 6/42* (2006.01)
(Continued)

(52) U.S. Cl.
CPC ......... *G02B 6/4293* (2013.01); *G02B 6/3875* (2013.01); *G02B 6/3885* (2013.01);
(Continued)

(58) Field of Classification Search
None
See application file for complete search history.

(56) References Cited

U.S. PATENT DOCUMENTS 6,892,449 B1    5/2005  Brophy et al.
7,559,702 B2 *  7/2009  Fujiwara .............. G02B 6/4292
                                                       385/88
(Continued)

FOREIGN PATENT DOCUMENTS

CN    105874366 A    8/2016
JP     11111400 A    4/1999
(Continued)

OTHER PUBLICATIONS

"International Application Serial No. PCT/US2013/076553, International Search Report dated Sep. 18, 2014", 3 pgs.
(Continued)

*Primary Examiner* — Sung Pak
(74) *Attorney, Agent, or Firm* — Schwegman Lundberg & Woessner, P.A.

(57) ABSTRACT

A single hybrid electrical/optical connector simultaneously forms both electrical and optical input/output connections by a single step engagement between elements on a connector and corresponding elements of the opposite gender on a mating connector. The connector can be surface-mounted on a circuit board, and a mating connector can be vertically pluggable onto the connector. The optical elements on the connector and/or the mating connector can be detachable, which can simplify assembly of a system that includes the circuit board. The hybrid electrical/optical connector has applications for optical transceivers. The hybrid electrical/optical connector includes a housing that extends laterally along a housing plane. The housing includes electrical and optical sockets thereon. In some examples, the electrical sockets and the optical sockets are laterally arranged on opposite sides of a division plane perpendicular to the housing plane.

24 Claims, 4 Drawing Sheets

(51) Int. Cl.
*H01R 12/71* (2011.01)
*G02B 6/38* (2006.01)
*G02B 6/43* (2006.01)

(52) U.S. Cl.
CPC ......... *G02B 6/4206* (2013.01); *G02B 6/4214* (2013.01); *G02B 6/4246* (2013.01); *G02B 6/4284* (2013.01); *H01R 12/716* (2013.01); *G02B 6/43* (2013.01)

(56) References Cited

U.S. PATENT DOCUMENTS

| | | | |
|---|---|---|---|
| 7,572,071 B1* | 8/2009 | Wu | G02B 6/3817 |
| | | | 385/101 |
| 8,019,187 B1 | 9/2011 | Dutta | |
| 8,083,418 B2* | 12/2011 | Fujiwara | G02B 6/4292 |
| | | | 385/92 |
| 8,936,403 B2* | 1/2015 | Howard | G02B 6/3829 |
| | | | 385/89 |
| 9,335,488 B2* | 5/2016 | Chan | G02B 6/3825 |
| 2004/0175079 A1 | 9/2004 | Goto | |
| 2005/0265670 A1 | 12/2005 | Sasser et al. | |
| 2006/0098923 A1* | 5/2006 | Fujiwara | G02B 6/4214 |
| | | | 385/88 |
| 2007/0122090 A1* | 5/2007 | Nishio | G02B 6/4201 |
| | | | 385/92 |
| 2007/0297713 A1 | 12/2007 | Lu et al. | |
| 2008/0298814 A1 | 12/2008 | Epitaux et al. | |
| 2010/0028017 A1 | 2/2010 | Mizoguchi | |
| 2011/0182554 A1 | 7/2011 | Hsieh | |
| 2011/0222861 A1 | 9/2011 | Pitwon et al. | |
| 2011/0255832 A1 | 10/2011 | Zhao et al. | |

FOREIGN PATENT DOCUMENTS

| | | |
|---|---|---|
| JP | 2003121697 A | 4/2003 |
| JP | 2009086256 A | 4/2009 |
| JP | 2010062087 A | 3/2010 |
| JP | 2011028006 A | 2/2011 |
| WO | WO-2009128413 A1 | 10/2009 |
| WO | WO-2013162550 A1 | 10/2013 |
| WO | WO-2015094283 A1 | 6/2015 |

OTHER PUBLICATIONS

"International Application Serial No. PCT/US2013/076553, Written Opinion dated Sep. 18, 2014", 8 pgs.

"Chinese Application Serial No. 201380081037.5, Office Action dated Dec. 2, 2016", w/English Translation.

"Chinese Application Serial No. 201380081037.5, Response filed Apr. 13, 2017 to Office Action dated Dec. 2, 2016", w/ English Claims, 7 pgs.

"International Application Serial No. PCT/US2013/076553, International Preliminary Report on Patentability dated Jun. 30, 2016", 10 pgs.

"Japanese Application Serial No. 2016-530213, Office Action dated Jan. 17, 2017", With English Translation, 17 pgs.

"Japanese Application Serial No. 2016-530213, Response filed Apr. 13, 2017 to Office Action dated Jan. 17, 2017", w/ English Claims, 15 pgs.

"Chinese Application Serial No. 201380081037.5, Office Action dated Jul. 24, 2017", w/English Translation, 15 pgs.

"European Application Serial No. 13899364.7, Extended European Search Report dated Jul. 19, 2017", 9 pgs.

"Korean Application Serial No. 10-2016-7013158, Office Action dated Aug. 22, 2017", W/English Translation, 16 pgs.

* cited by examiner

HYBRID ELECTRICAL/OPTICAL CONNECTOR

CROSS-REFERENCE TO RELATED APPLICATION

This application is a U.S. National Stage Filing under 35 U.S.C. 371 from International Application No. PCT/US2013/076553, filed on Dec. 19, 2013, and published as WO 2015/094283 on Jun. 25, 2015, which application is incorporated herein by reference in its entirety.

TECHNICAL FIELD

Examples generally relate to connectors for optical transceivers and computer input/output systems.

TECHNICAL BACKGROUND

Information handling systems may utilize both optical signal transmission and electrical signal transmission. In many instances, conversion between optical signals and electrical signals is necessary. In such instances, a transceiver may be utilized to convert between signal types. As devices continue to shrink, there is pressure to make components such as signal transmission lines, transceivers, etc. smaller and more reliable.

Many existing optical transceivers include separate electrical and optical connectors. For instance, a particular pluggable transceiver can have an electrical connector at its back end and an optical connector at its front end. Use of two separate connectors can consume physical space on the transceiver and can require additional assembly steps. It is desirable to reduce cost and increase reliability and ease of use for components such as optical transceivers and associated connectors.

BRIEF DESCRIPTION OF THE DRAWINGS

In the drawings, which are not necessarily drawn to scale, like numerals may describe similar components in different views. The drawings illustrate generally, by way of example, but not by way of limitation, various embodiments discussed in the present document.

DETAILED DESCRIPTION

In the present disclosure, directional references are made with respect to a plane of a circuit board. It is understood that directional references such as "upward," "lateral," "downward," etc. are in reference to the circuit board, regardless of the actual orientation of the circuit board.

A single hybrid electrical/optical connector simultaneously forms both electrical and optical input/output connections by a single step engagement between elements on a connector and corresponding elements of the opposite gender on a mating connector. The connector can be surface-mounted on a circuit board, and a mating connector can be vertically pluggable onto the connector. The optical elements on the connector and/or the mating connector can be detachable, which can simplify assembly of a system that includes the circuit board. The hybrid electrical/optical connector has applications for optical transceivers. Optical transceivers convert received electrical signals to optical signals and transmit the optical signals through optical fibers, and also convert optical signals received from the optical fibers to electrical signals.

Compared to designs that feature separate optical and electrical connections, the present connectors that simultaneously perform optical and electrical connections can have several advantages. For example, the present connectors can occupy less space. As another example, the present connectors can simplify installation, by using a single installation step to perform both optical and electrical connections. As still another example, the present connectors can improve system-level fiber management, by allowing the fiber to be installed before the transceiver. As still another example, the present connectors can allow exchanging of transceivers without disturbing optical fibers.

Figure 1:
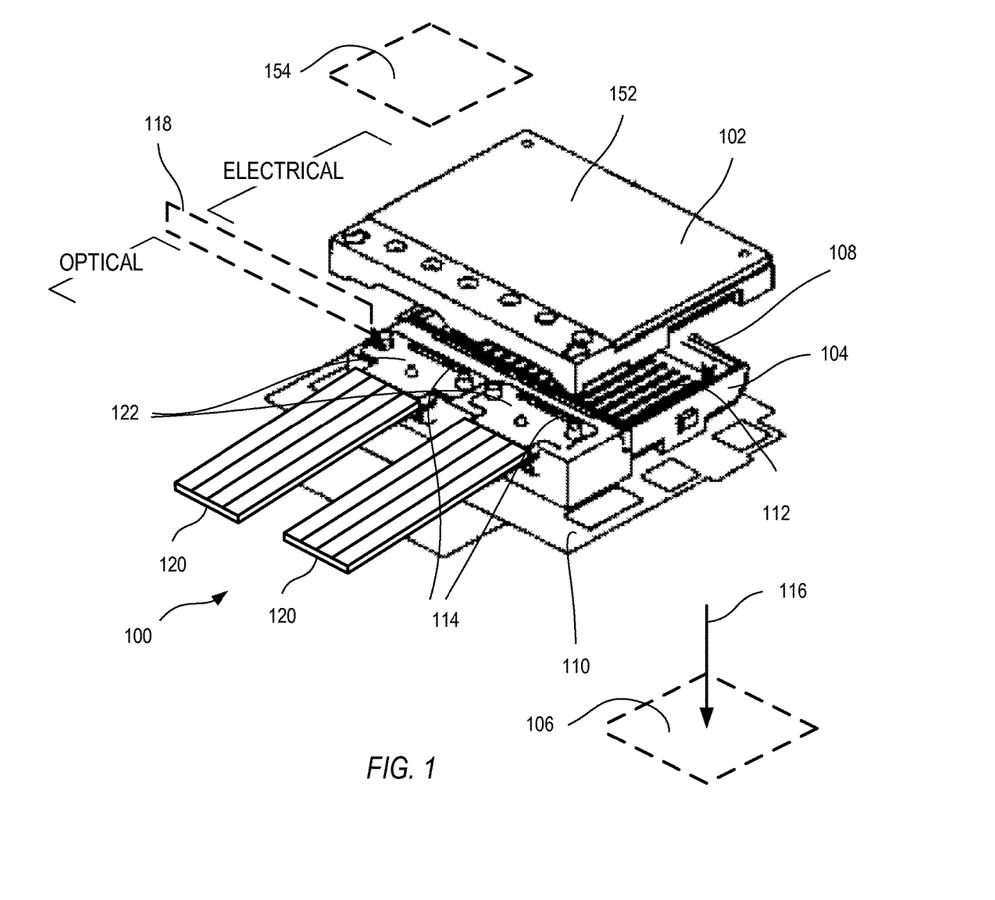
FIG. 1 illustrates an example of a connector and a mating connector according to an example of the invention.

FIG. 1 illustrates an example of a first connector 100 and a second connector 102. When the second connector 102 is attached to the first connector 100, by forcing the second connector 102 against the first connector 100, the second connector 102 simultaneously forms optical and electrical connections with the first connector 100. In one example, the second connector 102 connects to the first connector 100 via a low insertion force (LIF) connection. In one example, the second connector 102 connects to the first connector 100 via a Land Grid Array (LGA) connection. In other examples, the second connector 102 connects to the first connector 100 via a compression-style connection, or another suitable connection. The second connector 102 is not part of the first connector 100.

The first connector 100 includes a housing 104 that extends laterally along a housing plane 106. In some examples, the housing 104 has a rectangular periphery 108. In some examples, the periphery 108 can include one or more features that can laterally position the second connector 102, such as a ridge or a lip.

The housing 104 is configured to be installed on a circuit board 110 and be generally parallel to a plane of the circuit board 110 when the housing 104 is installed on the circuit board 110. The circuit board 110 is typically not part of the first connector 100. In some examples, the housing 104 is configured to be surface-mounted on the circuit board 110. In some examples, the circuit board 110 is for an optical transceiver.

The housing 104 includes a plurality of electrical sockets 112 and a plurality of optical sockets 114 thereon. The electrical sockets 112 and the optical sockets 114 are connectable in an insertion direction 116 perpendicular to the housing plane 106. In one example, the electrical sockets 112 and the optical sockets 114 are laterally arranged on opposite sides of a division plane 118 perpendicular to the housing plane 106. There can be advantages to separating the electrical sockets 112 from the optical sockets 114, such as simplifying the layout of the host circuit board 110, simplifying the layout of the fibers within the system that includes the host circuit board 110, and others.

The electrical sockets 112 on the housing 104 electrically connect with corresponding elements of the opposite gender on the second connector 102. In some examples, at least one of the electrical sockets 112 is female. In other examples, at least one of the electrical sockets 112 is male. In still other examples, the electrical sockets 112 include both female and male elements. In some examples, the electrical sockets 112 are arranged in a rectangular grid. In some examples, the second connector 102 connects to the housing 104 at a periphery of the electrical sockets 112. In some examples, the electrical sockets 110 are configured to connect simultaneously to the second connector 102. In some examples, the optical sockets 114 are configured to connect simultaneously to the second connector 102. In some examples, the electrical sockets 110 and optical sockets 114 are all configured to connect simultaneously to the second connector 102. As shown in FIG. 1, in one example, the second connector 102 is engaged with the first connector 100 along insertion direction 116. In one example, the optical sockets 114 and electrical sockets 112 are both facing the same direction, which facilitates simultaneous connection. In the example shown, both the optical sockets 114 and electrical sockets 112 are facing upward, away from the board 110 to facilitate simultaneous connection in the insertion direction 116 as shown.

In some examples, the second connector 102 includes circuitry for an embedded optical transceiver. By integrating the optical transceiver in the second connector, a number of connector components is reduced, and assembly in simplified. In other examples, an optical transceiver is located in the first connector 100. In some examples, the housing includes a latch/de-latch feature for installing and removing the optical sockets 114. In some examples, the housing includes a latch and ejection feature for installing and removing a transceiver module.

Figure 2:
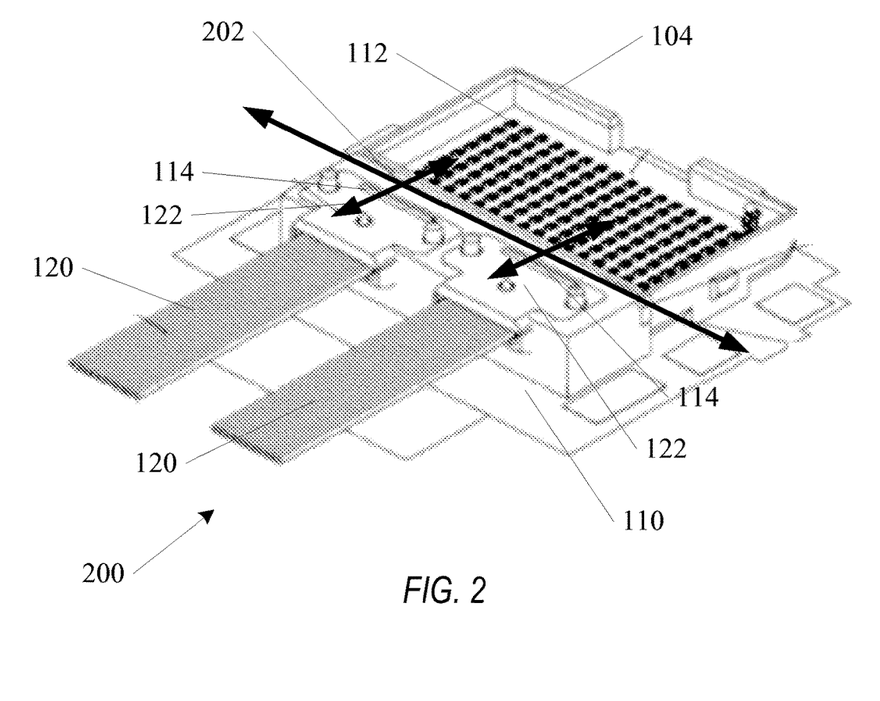
FIG. 2 illustrates an example of a connector component according to an example of the invention.

In some examples, the optical sockets 114 are floated laterally and vertically in the housing. FIG. 2 shows an unobstructed view of the first connector 100 from FIG. 1. As shown in FIG. 2, in one example, the optical sockets 114 are permitted a range of motion within a plane parallel to the board 110, for example, along directions 202. In one example a range of motion may be accomplished using location pins with a tolerance fit that permits a limited amount of movement. In one example, by allowing a range of motion, the optical sockets 114 are more easily aligned with mating connectors on the second connector 102. In one example, the electrical sockets 112 mate with corresponding electrical sockets on the second connector 102 (not shown) and the electrical sockets 112 substantially determine an alignment of the second connector to the first connector 100. Motion within a plane parallel to the board 110, such as directions 202, then allows for optical sockets 114 to more flexibly mate with corresponding connections on an underside of the second connector (not shown).

As shown in FIG. 1, in some examples, the second connector 102 includes a second housing 152 extending laterally along a second housing plane 154. In some examples, the second housing 152 is configured to mechanically couple to the housing 104, the housing 104 being installed on a circuit board 110. In some examples, the second housing 152 and the housing 104 are both generally parallel to a plane of the circuit board 110 when the housing 104 is installed on the circuit board 110 and when the second housing 152 is coupled to the housing 104. In some examples, the second housing 152 is configured to mechanically couple in a plane generally parallel to a plane of the circuit board 110. In some examples, the second housing 152 includes a plurality of electrical sockets and a plurality of optical sockets thereon. In some examples, the electrical sockets and the optical sockets are connectable in an insertion direction perpendicular to the second housing 152 plane. In some examples, the electrical sockets and the optical sockets are laterally arranged on opposite sides of a division plane perpendicular to the mating housing plane 154.

In some examples, at least one of the optical sockets 114 includes a beam steering element that directs an optical path from the second connector to a ribbon fiber 120. The ribbon fiber 120 can extend laterally from the housing 104 in the housing plane 106. Each ribbon fiber 120 can include multiple fibers that extend parallel to one another. Each ribbon fiber 120 optically connects to a respective ferrule 122 in the first connector 100. In the configuration of FIG. 1, light traveling from lower/left to upper/right in a ribbon fiber 120 is collimated and bent upward, and exits the first connector 100 traveling upward. The optical paths are reversible, so that outgoing signals from the second connector 102 that strike the first connector 100 can be focused into an appropriate fiber in one of the ribbon fibers 120.

Although examples using a ribbon fiber 120 are shown for illustration, the invention is not so limited. One of ordinary skill in the art will recognize that other configurations of optical fibers are within the scope of the invention, such as individual fibers, bundled fibers, etc.

In some examples, at least one of the optical sockets 114 includes a plastic molded fiber collimator having an optical path that includes an approximately ninety degree bend. In some examples, the plastic molded fiber collimator comprises a free-form off-axis parabola. In some examples, the ferrule 122 is molded with Ultem material and is installed inside a ferrule house. The ferrule house can be mounted on the first connector 100 or the second connector 102. In some examples, at least one of the optical sockets 114 includes at least one ferrule 122 that floats laterally, in the housing plane 106, to self-align to a corresponding element in the second connector 102. In some examples, the ferrules 122 are detachable from the first connector 100. In some examples, the optical fibers from the ferrules 122 can be pre-fixed or merged into planar optical circuitries on the host circuit board 110.

Figure 3:
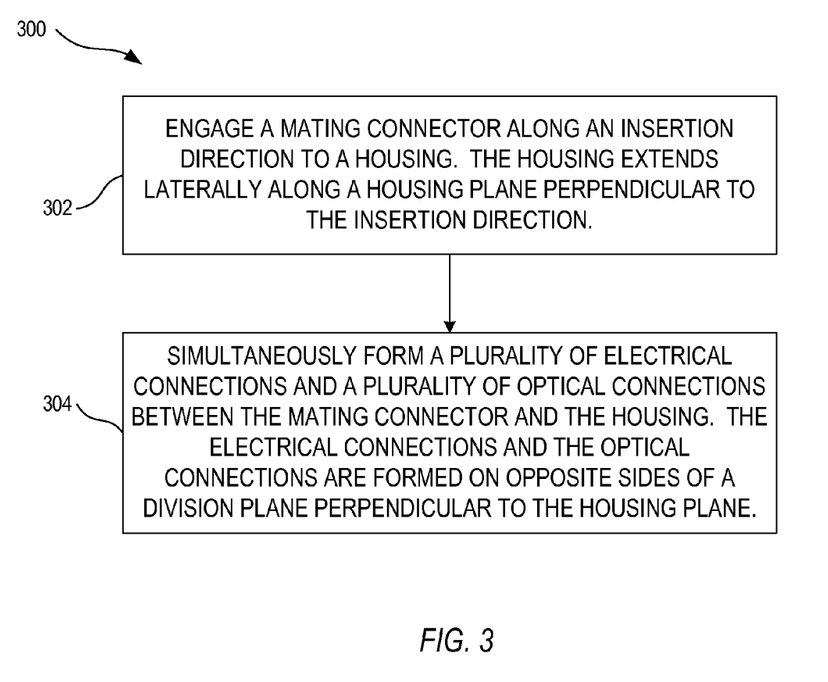
FIG. 3 is a flow chart of an example of a method using a connector according to an example of the invention.

FIG. 3 is a flow chart of an example of a method 300 for simultaneously forming optical and electrical connections. The method can be executed on the first connector 100 of FIG. 1, or on any suitable connector.

At 302, method 300 engages a second connector along an insertion direction to a housing. The housing extends laterally along a housing plane perpendicular to the insertion direction. At 304, method 300 simultaneously forms a plurality of electrical connections and a plurality of optical connections between the second connector and the housing. The electrical connections and the optical connections are formed on opposite sides of a division plane perpendicular to the housing plane.

In some examples, engaging the second connector along the insertion direction to the housing comprises aligning at least one locating feature around a periphery of the second connector to at least one corresponding locating feature around a periphery of the housing. In some examples, engaging the second connector along the insertion direction to the housing further comprises urging the second connector against the housing along the insertion direction. In some examples, at least one of the optical connections includes at least one ferrule in the housing that floats laterally, in the housing plane, to self-align to a corresponding element in the second connector. In some examples, one of the connectors includes an optical transceiver. In one example, the optical transceiver is integrally formed into the housing of either the first or second connector.

Figure 4:
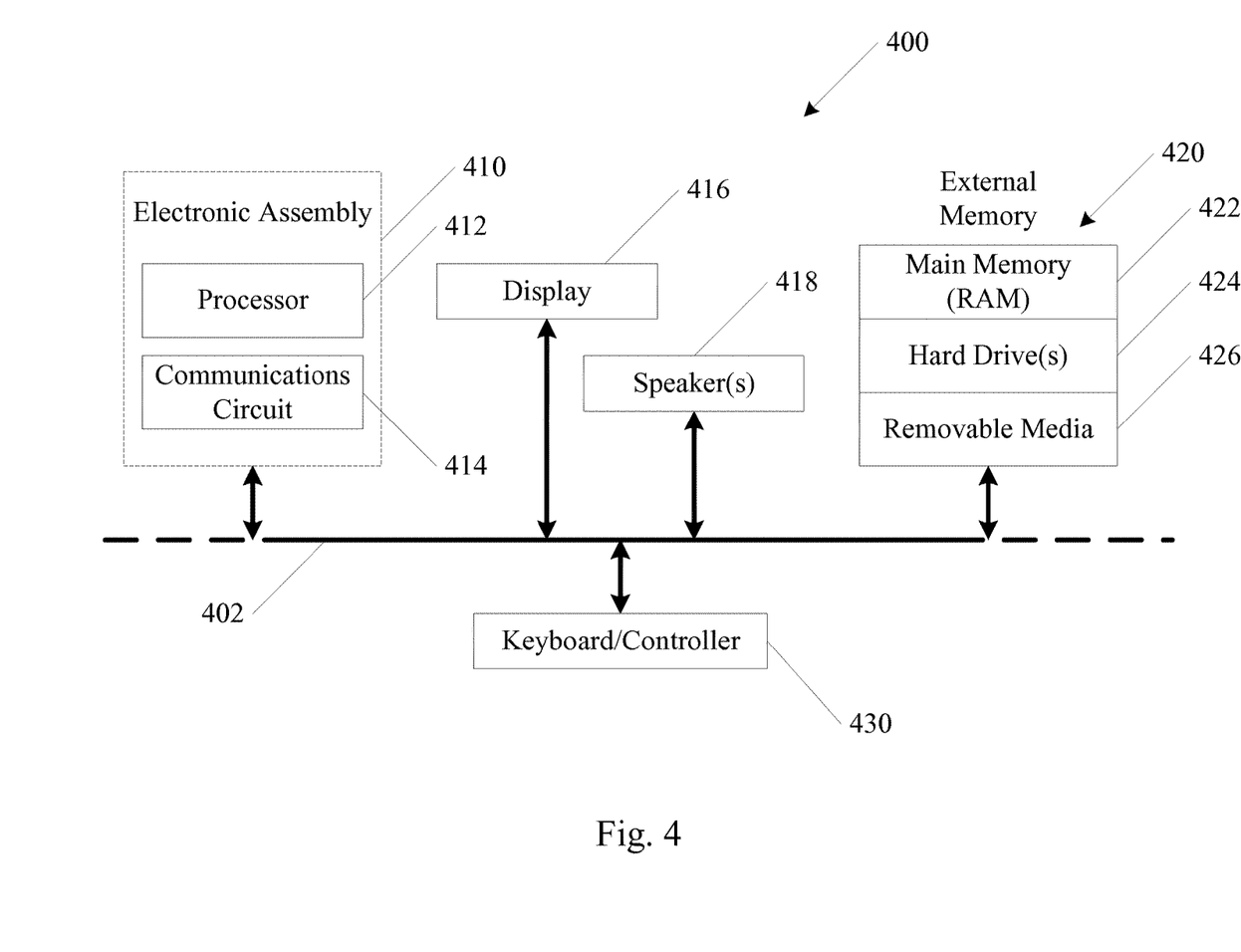
FIG. 4 is block diagram of an electronic system in accordance with some embodiments of the invention.

An example of an electronic device using electrical/optical connectors as described in the present disclosure is included to show an example of a higher level device application for the present invention. FIG. 4 is a block diagram of an electronic device 400 incorporating at least one electrical/optical connector and/or method in accordance with at least one embodiment of the invention. Electronic device 400 is merely one example of an electronic system in which embodiments of the present invention can be used. Examples of electronic devices 400 include, but are not limited to personal computers, tablet computers, mobile telephones, game devices, MP3 or other digital music players, etc. In one example, at least one MEMS switch and/or method in accordance with at least one embodiment of the invention is used in conjunction with an antenna for selecting a desired frequency. MEMS switches are useful in antenna systems because they may provide switching capability with very low loss of signal, or insertion loss, from the switches.

In this example, electronic device 400 comprises a data processing system that includes a system bus 402 to couple the various components of the system. System bus 402 provides communications links among the various components of the electronic device 400 and can be implemented as a single bus, as a combination of busses, or in any other suitable manner.

An electronic assembly 410 is coupled to system bus 402. The electronic assembly 410 can include any circuit or combination of circuits. In one embodiment, the electronic assembly 410 includes a processor 412 which can be of any type. As used herein, "processor" means any type of computational circuit, such as but not limited to a microprocessor, a microcontroller, a complex instruction set computing (CISC) microprocessor, a reduced instruction set computing (RISC) microprocessor, a very long instruction word (VLIW) microprocessor, a graphics processor, a digital signal processor (DSP), multiple core processor, or any other type of processor or processing circuit.

Other types of circuits that can be included in electronic assembly 410 are a custom circuit, an application-specific integrated circuit (ASIC), or the like, such as, for example, one or more circuits (such as a communications circuit 414) for use in wireless devices like mobile telephones, tablet computers, laptop computers, two-way radios, and similar electronic systems. The IC can perform any other type of function.

The electronic device 400 can also include an external memory 420, which in turn can include one or more memory elements suitable to the particular application, such as a main memory 422 in the form of random access memory (RAM), one or more hard drives 424, and/or one or more drives that handle removable media 426 such as compact disks (CD), flash memory cards, digital video disk (DVD), and the like.

The electronic device 400 can also include a display device 416, one or more speakers 418, and a keyboard and/or controller 430, which can include a mouse, trackball, touch screen, voice-recognition device, or any other device that permits a system user to input information into and receive information from the electronic device 400.

To better illustrate the method and apparatuses disclosed herein, a non-limiting list of embodiments is provided here:

Example 1 is a connector comprising: a housing extending laterally along a housing plane, the housing configured to be installed on a circuit board and be generally parallel to a plane of the circuit board when the housing is installed on the circuit board, the housing including a plurality of electrical sockets and a plurality of optical sockets thereon, the electrical sockets and the optical sockets being connectable in an insertion direction perpendicular to the housing plane, the electrical sockets and the optical sockets being laterally arranged on opposite sides of a division plane perpendicular to the housing plane.

In Example 2, the subject matter of Example 1 can optionally include wherein the housing includes a latch/delatch feature for installing and removing the optical sockets.

In Example 3, the subject matter of Examples 1 or 2 can optionally include wherein the housing includes a latch and ejection feature for installing and removing a transceiver module.

In Example 4, the subject matter of any one of Examples 1-3 can optionally include wherein the electrical sockets are floated laterally, in the housing plane, and vertically, perpendicular to the housing plane.

In Example 5, the subject matter of any one of Examples 1-4 can optionally include wherein the housing is configured to be surface-mounted on the circuit board.

In Example 6, the subject matter of any one of Examples 1-5 can optionally include wherein at least one of the electrical sockets is female.

In Example 7, the subject matter of any one of Examples 1-6 can optionally include wherein the electrical sockets are arranged in a rectangular grid.

In Example 8, the subject matter of any one of Examples 1-7 can optionally include wherein the electrical sockets are configured to connect simultaneously to a second connector.

In Example 9, the subject matter of any one of Examples 1-8 can optionally include wherein at least one of the optical sockets includes at least one ferrule that floats laterally, in the housing plane, and vertically, perpendicular to the housing plane, to self-align to a corresponding element in a second connector.

In Example 10, the subject matter of any one of Examples 1-9 can optionally include wherein at least one of the optical sockets includes a beam steering element that directs an optical path from the second connector to a ribbon fiber, the ribbon fiber extending laterally from the housing in the housing plane.

In Example 11, the subject matter of any one of Examples 1-10 can optionally include wherein at least one of the optical sockets includes a plastic molded fiber collimator having an optical path that includes a ninety degree bend; and wherein the plastic molded fiber collimator comprises a free-form off-axis parabola.

In Example 12, the subject matter of any one of Examples 1-11 can optionally include wherein a second connector connects to the housing via a low insertion force (LIF) connection, a Land Grid Array (LGA) connection, or compression-style connection.

In Example 13, the subject matter of any one of Examples 1-12 can optionally include wherein a second connector connects to the housing at a periphery of the electrical sockets.

In Example 14, the subject matter of any one of Examples 1-13 can optionally include wherein the circuit board is for a high-speed interconnect for a computer system, a switch, a router, a SerDes, an FPGA package, or an optical transceiver.

Example 15 is a connector, including: a housing extending laterally along a housing plane, the housing including a plurality of electrical sockets and a plurality of optical sockets thereon, the housing configured to mechanically couple in a plane generally parallel to a plane of a circuit board, the electrical sockets and the optical sockets being connectable in an insertion direction perpendicular to the housing plane, the electrical sockets and the optical sockets being laterally arranged on opposite sides of a division plane perpendicular to the housing plane.

In Example 16, the subject matter of Examples 15 can optionally include further comprising circuitry for an embedded optical transceiver.

Example 17 is a connector comprising: a housing extending laterally along a housing plane, the housing configured to be installed on a circuit board and be generally parallel to a plane of the circuit board when the housing is installed on the circuit board, the housing including a plurality of electrical sockets and a plurality of optical sockets thereon, the electrical sockets and the optical sockets being connectable in an insertion direction perpendicular to the housing plane, the electrical sockets and the optical sockets being laterally arranged on opposite sides of a division plane perpendicular to the housing plane, the housing including a latch/de-latch feature for installing and removing the optical sockets, the housing including a latch and ejection feature for installing and removing a transceiver module; wherein the electrical sockets are floated laterally, in the housing plane, and vertically, perpendicular to the housing plane.

In Example 18, the subject matter of Example 17 can optionally include wherein at least one of the optical sockets includes at least one ferrule that floats laterally, in the housing plane, and vertically, perpendicular to the housing plane, to self-align to a corresponding element in a second connector.

In Example 19, the subject matter of Examples 17 or 18 can optionally include wherein at least one of the optical sockets includes a beam steering element that directs an optical path from the second connector to a ribbon fiber, the ribbon fiber extending laterally from the housing in the housing plane.

In Example 20, the subject matter of any one of Examples 17-19 can optionally include wherein at least one of the optical sockets includes a plastic molded fiber collimator having an optical path that includes a ninety degree bend; and wherein the plastic molded fiber collimator comprises a free-form off-axis parabola.

In Example 21, the subject matter of any one of Examples 17-20 can optionally include wherein a second connector connects to the housing via a low insertion force (LIF) connection, a Land Grid Array (LGA) connection, or compression-style connection.

Example 22 is a method for simultaneously forming optical and electrical connections, the method comprising: engaging a second connector along an insertion direction to a housing, the housing extending laterally along a housing plane perpendicular to the insertion direction; and simultaneously forming a plurality of electrical connections and a plurality of optical connections between the second connector and the housing, the electrical connections and the optical connections being formed on opposite sides of a division plane perpendicular to the housing plane.

In Example 23, the subject matter of Example 22 can optionally include wherein engaging the second connector along the insertion direction to the housing comprises: aligning at least one locating feature around a periphery of the second connector to at least one corresponding locating feature around a periphery of the housing.

In Example 24, the subject matter of Example 23 can optionally include wherein engaging the second connector along the insertion direction to the housing further comprises: forcing the second connector against the housing along the insertion direction.

In Example 25, the subject matter of any one of Examples 22-24 can optionally include wherein at least one of the optical connections includes at least one ferrule in the housing that floats laterally, in the housing plane, to self-align to a corresponding element in the second connector.

The above Detailed Description includes references to the accompanying drawings, which form a part of the Detailed Description. The drawings show, by way of illustration, specific embodiments in which methods, apparatuses, and systems discussed herein can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. An electrical-optical connector comprising:
a first connector, including:
a first housing extending laterally along a housing plane, wherein:

the first housing is configured to be installed on a circuit board and is generally parallel to a plane of the circuit board when the first housing is installed on the circuit board, the first housing including a plurality of electrical sockets and a plurality of optical sockets thereon, the electrical sockets and the optical sockets being connectable in an insertion direction perpendicular to the housing plane, the electrical sockets and the optical sockets being laterally arranged on opposite sides of a division plane perpendicular to the housing plane; and a second connector including:

a second housing configured to couple with the first housing, and an optical transceiver.

2. The electrical-optical connector of claim 1, wherein the first housing includes a latch/de-latch feature for installing and removing the optical sockets.

3. The electrical-optical connector of claim 1, wherein the first housing includes a latch and ejection feature for installing and removing the second housing.

4. The electrical-optical connector of claim 1, wherein the electrical sockets are floated laterally, in the housing plane, and vertically, perpendicular to the housing plane.

5. The electrical-optical connector of claim 1, wherein the first housing is configured to be surface-mounted on the circuit board.

6. The electrical-optical connector of claim 1, wherein at least one of the electrical sockets is female.

7. The electrical-optical connector of claim 1, wherein the electrical sockets are arranged in a rectangular grid.

8. The electrical-optical connector of claim 1, wherein the electrical sockets are configured to connect simultaneously to the second connector.

9. The electrical-optical connector of claim 1, wherein at least one of the optical sockets includes at least one ferrule that floats laterally, in the housing plane, and vertically, perpendicular to the housing plane, to self-align to a corresponding element in the second connector.

10. The electrical-optical connector of claim 1, wherein at least one of the optical sockets includes a beam steering element that directs an optical path from the second connector to a ribbon fiber, the ribbon fiber extending laterally from the housing in the housing plane.

11. The electrical-optical connector of claim 1,
wherein at least one of the optical sockets includes a plastic molded fiber collimator having an optical path that includes a ninety degree bend; and
wherein the plastic molded fiber collimator comprises a free-form off-axis parabola.

12. The electrical-optical connector of claim 1, wherein the second connector connects to the first connector via a low insertion force (LIF) connection, a Land Grid Array (LGA) connection, or compression-style connection.

13. The electrical-optical connector of claim 1, wherein the second connector connects to the first connector at a periphery of the electrical sockets.

14. The electrical-optical connector of claim 1, wherein the circuit board is for a high-speed interconnect for a computer system, a switch, a router, a SerDes, an FPGA package, or the optical transceiver.

15. A connector, comprising:
a first housing extending laterally along a housing plane, the first housing including a plurality of electrical sockets and a plurality of optical sockets thereon, the first housing configured to mechanically couple in a plane generally parallel to a plane of a circuit board, the electrical sockets and the optical sockets being connectable in an insertion direction perpendicular to the housing plane, the electrical sockets and the optical sockets being laterally arranged on opposite sides of a division plane perpendicular to the housing plane; and a second housing including circuitry for an embedded optical transceiver.

16. An electrical-optical connector comprising:
a first connector, including:
a first housing extending laterally along a housing plane,
the first housing configured to be installed on a circuit board and be generally parallel to a plane of the circuit board when the first housing is installed on the circuit board, the first housing including a plurality of electrical sockets and a plurality of optical sockets thereon, the electrical sockets and the optical sockets being connectable in an insertion direction perpendicular to the housing plane, the electrical sockets and the optical sockets being laterally arranged on opposite sides of a division plane perpendicular to the housing plane, the first housing including a latch/de-latch feature for installing and removing the optical sockets, a second connector including a second housing configured to couple with the first housing, the second connector including an optical transceiver, and the first housing including a latch and ejection feature for installing and removing the second connector;

wherein the electrical sockets are floated laterally, in the housing plane, and vertically, perpendicular to the housing plane.

17. The electrical-optical connector of claim 16, wherein at least one of the optical sockets includes at least one ferrule that floats laterally, in the housing plane, and vertically, perpendicular to the housing plane, to self-align to a corresponding element in the second connector.

18. The electrical-optical connector of claim 16, wherein at least one of the optical sockets includes a beam steering element that directs an optical path from the second connector to a ribbon fiber, the ribbon fiber extending laterally from the first housing in the housing plane.

19. The electrical-optical connector of claim 16, wherein at least one of the optical sockets includes a plastic molded fiber collimator having an optical path that includes a ninety degree bend; and
wherein the plastic molded fiber collimator comprises a free-form off-axis parabola.

20. The electrical-optical connector of claim 16, wherein the second connector connects to the first connector via a low insertion force (LIF) connection, a Land Grid Array (LGA) connection, or compression-style connection.

21. A method for simultaneously forming optical and electrical connections, the method comprising:
engaging a mating connector along an insertion direction to a housing, the mating connector including an optical transceiver, and the housing extending laterally along a housing plane perpendicular to the insertion direction; and
simultaneously forming a plurality of electrical connections and a plurality of optical connections between the mating connector and the housing, the electrical connections and the optical connections being formed on opposite sides of a division plane perpendicular to the housing plane.

22. The method of claim 21, wherein engaging the mating connector along the insertion direction to the housing comprises:
   aligning at least one locating feature around a periphery of the mating connector to at least one corresponding locating feature around a periphery of the housing.

23. The method of claim 22, wherein engaging the mating connector along the insertion direction to the housing further comprises:
   forcing the mating connector against the housing along the insertion direction.

24. The method of claim 21, wherein at least one of the optical connections includes at least one ferrule in the housing that floats laterally, in the housing plane, to self-align to a corresponding element in the mating connector.

\* \* \* \* \*